United States Patent
Janardhana et al.

(10) Patent No.: US 10,771,341 B2
(45) Date of Patent: Sep. 8, 2020

(54) INTELLIGENT STATE CHANGE NOTIFICATIONS IN COMPUTER NETWORKS

(71) Applicant: Dell Products L.P., Round Rock, TX (US)

(72) Inventors: Ashok Kumar Janardhana, Chennai (IN); Satya Boddu, Chennai (IN); Mahendaran Pagalpatti Vijayakumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 190 days.

(21) Appl. No.: 15/945,566

(22) Filed: Apr. 4, 2018

(65) Prior Publication Data

US 2019/0312783 A1    Oct. 10, 2019

(51) Int. Cl.
*H04L 12/24* (2006.01)
*H04L 12/931* (2013.01)
*H04L 12/947* (2013.01)

(52) U.S. Cl.
CPC .......... *H04L 41/12* (2013.01); *H04L 41/0618* (2013.01); *H04L 41/0686* (2013.01); *H04L 41/0893* (2013.01); *H04L 49/357* (2013.01); *H04L 49/25* (2013.01)

(58) Field of Classification Search
CPC ... H04L 41/12; H04L 41/0893; H04L 49/357; H04L 49/25; H04L 41/0618; H04L 41/0686
See application file for complete search history.

(56) References Cited

U.S. PATENT DOCUMENTS

| 8,295,288 B2 | 10/2012 | Chen et al. | |
|---|---|---|---|
| 2008/0114961 A1 | 5/2008 | Ramaswamy et al. | |
| 2009/0319652 A1* | 12/2009 | Odenwald, Jr. | H04L 67/1097 709/223 |
| 2011/0228696 A1* | 9/2011 | Agarwal | H04L 41/12 370/253 |
| 2011/0299525 A1 | 12/2011 | Peterson | |
| 2012/0166829 A1* | 6/2012 | Jinno | G06F 3/0625 713/320 |
| 2014/0156878 A1* | 6/2014 | Hameed | G06F 3/00 710/19 |
| 2014/0372721 A1 | 12/2014 | Nakajima | |

(Continued)

FOREIGN PATENT DOCUMENTS

WO    WO-2015027716 A1 *    3/2015    ........ H04L 43/0817

OTHER PUBLICATIONS

Steve Wilson, Claudio Desanti, Craig W. Carlson, Louis Ricci and Jason Rusch, "Fibre Channel," Aug. 3, 2016, 395 Pages, Generic Services 7 (FC-GS-7), INCITS 510-201x, T11/Project 2204-D, Rev. 10.8, Information Technology Industry Council, Global Engineering, Englewood, CO.

*Primary Examiner* — Mounir Moutaouakil
(74) *Attorney, Agent, or Firm* — Haynes and Boone, LLP (57) ABSTRACT

In a Fibre Channel network (102), Registered State Change Notifications (RSCNs) are limited by the nodes' roles—target or initiator. If a state change occurs at a target (110s), then the RSCNs are sent to all the nodes (110) in the same zone as the target. But if a state change occurs at an initiator, the RSCNs are sent only to targets, not initiators (110h), to reduce RSCN traffic. Other features are also provided.

20 Claims, 6 Drawing Sheets

(56) References Cited

U.S. PATENT DOCUMENTS

| | | |
|---|---|---|
| 2015/0012679 A1* | 1/2015 | Davis .................... G06F 13/364 |
| | | 710/110 |
| 2015/0036682 A1 | 2/2015 | Atkinson |
| 2015/0227325 A1 | 8/2015 | Rupanagunta et al. |
| 2015/0288558 A1* | 10/2015 | Gates ................. H04L 41/0686 |
| | | 714/57 |
| 2017/0093678 A1* | 3/2017 | Gnanasekaran .... G06F 13/4022 |
| 2017/0134220 A1 | 5/2017 | Chen et al. |

* cited by examiner

Name Server DB 220DB

Record 410: HBA-1, Port 110Ph

Switch Name            10:00:14:18:77:20:7b:cf
Domain Id               2
Switch Port             fibrechannel1/1/30:3
FC-Id                    02:7a:00
Port Name             10:00:00:90:fa:02:09:1e
Node Name            20:00:00:90:fa:02:09:1e
Class of Service     8
Symbolic Port
 Name                Emulex PPN 10:00:00:90:fa:02:09:1e
Symbolic Node
 Name                Emulex LPe16002-M6-D
 FV10.6.133.18 DV8.3.5.86.1p
Port Type              N_PORT
Registered with NameServer    Yes
Registered for SCN Yes
Device role             Initiator

Record 410: 110As-1, Port 110Ps

Switch Name            10:00:14:18:77:20:7b:cf
Domain Id               2
Switch Port             fibrechannel1/1/9
FC-Id                    02:24:00
Port Name             50:00:d3:10:04:9d:74:05
Node Name            50:00:d3:10:04:9d:74:00
Class of Service     8
Symbolic Port Name       Compellent Port
 QLGC FC 16/32Gbps; Slot=01 Port=01 in
 Controller: Top Controller of Storage Center:
 Storage Center 302452
Symbolic Node Name       Compellent Storage
 Center: Storage Center 302452
Port Type              N_PORT
Registered with NameServer    Yes
Registered for SCN       Yes
Device role             Target

INTELLIGENT STATE CHANGE NOTIFICATIONS IN COMPUTER NETWORKS

BACKGROUND OF THE INVENTION

The present disclosure relates to computer networks.

Computer networks are widely used for storage and processing of large amounts of data. For example, storage area networks (SANs) are used by commercial data centers to provide cloud storage and other services to both individual and business clients.

A storage area network needs high bandwidth, low latency, and high security, and should be easy to administrate to avoid service delays when computer hardware or software is added, removed, updated, etc. in response to changing demands or failures.

Figure 1:
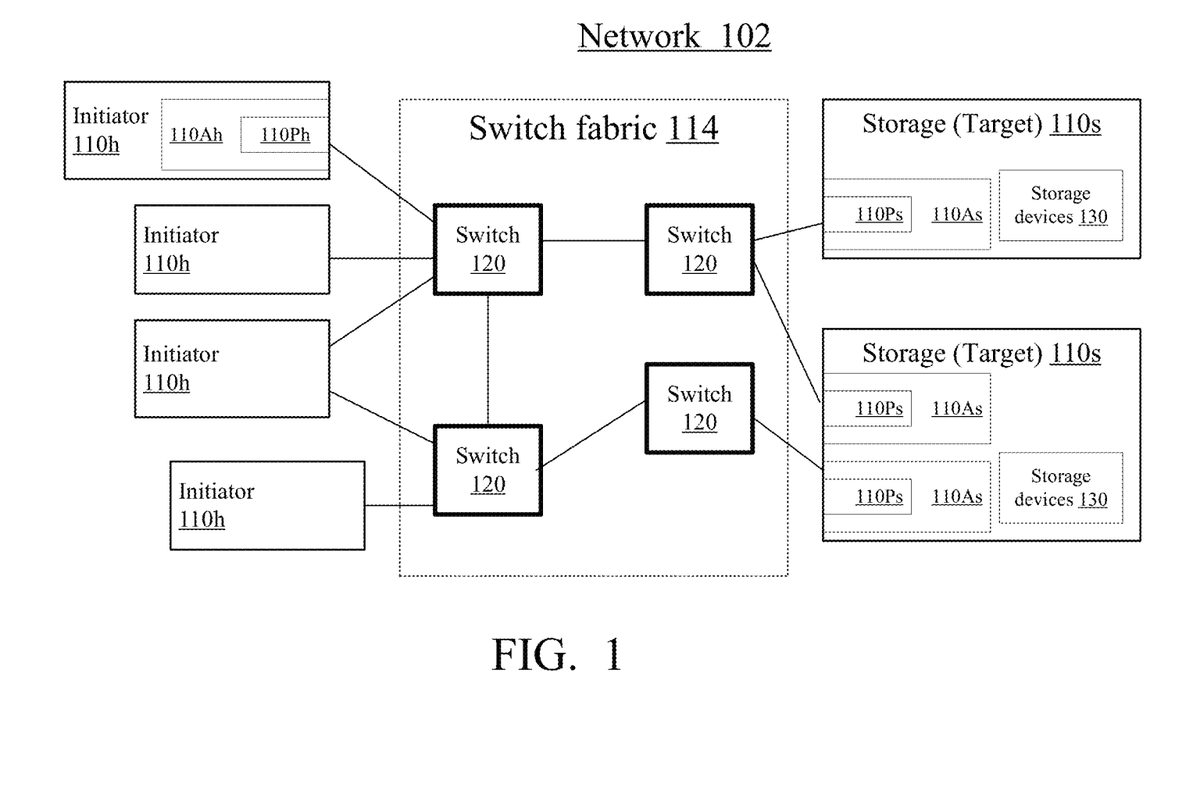
FIGS. 1 and 2 are block diagrams of Fibre Channel networks used in some embodiments of the present invention.

A network example suitable for SAN is a Fibre Channel (FC) network, standardized by the International Committee for Information Technology Standards (INCITS), which is accredited by American National Standards Institute (ANSI). FIG. 1 illustrates an FC network 102. Computer nodes 110, shown as initiators 110$h$ and targets 110$s$, communicate with each other over a switch fabric 114 having one or more switches 120. Each node 110$s$ is a computer system including data storage devices 130, such as magnetic or optical disks or magnetic tapes, accessible to initiator nodes 110$h$ as if the storage devices were part of the initiator nodes. For example, a device 130 can be a disk accessible to an initiator 110$h$ if the initiator specifies the disk's sector number and a starting offset within the sector.

An initiator 110$h$ can be a server communicating with other computers (not shown) over the Internet. Initiator 110$h$ initiates a communication with a target 110$s$ to store or retrieve data from the target's device(s) 130. If a node 110 changes state—e.g. goes down, logs out, or changes its name, or a new node 110 or new devices 130 are connected to the network, or existing devices are disconnected or reconfigured, etc.—the switches 120 notify the other nodes 110 that a state change occurred. These notifications are called Registered State Change Notifications, or RSCNs. The other nodes can then query the switch fabric for specific information on the state change.

In a network with thousands of computers 110 and 120 serving many clients, RSCNs and subsequent queries generate significant traffic, sapping bandwidth and interrupting other communications. See U.S. Pat. No. 8,295,288 issued Oct. 23, 2012 to Chen et al. and incorporated herein by reference.

The RSCN-related traffic (RSCNs and subsequent queries) can be reduced by zoning. A zone is a set of nodes 110 allowed to communicate with each other. Some nodes 110 never communicate with each other and can be placed in different zones. Such nodes do not need RCSNs regarding each other's state, so the RSCNs are limited to the zone in which a state change occurred. Zones are defined by a human administrator using network management software running on a node 110$h$ or some other computer.

A single node 110 can be in multiple zones.

Figure 2:
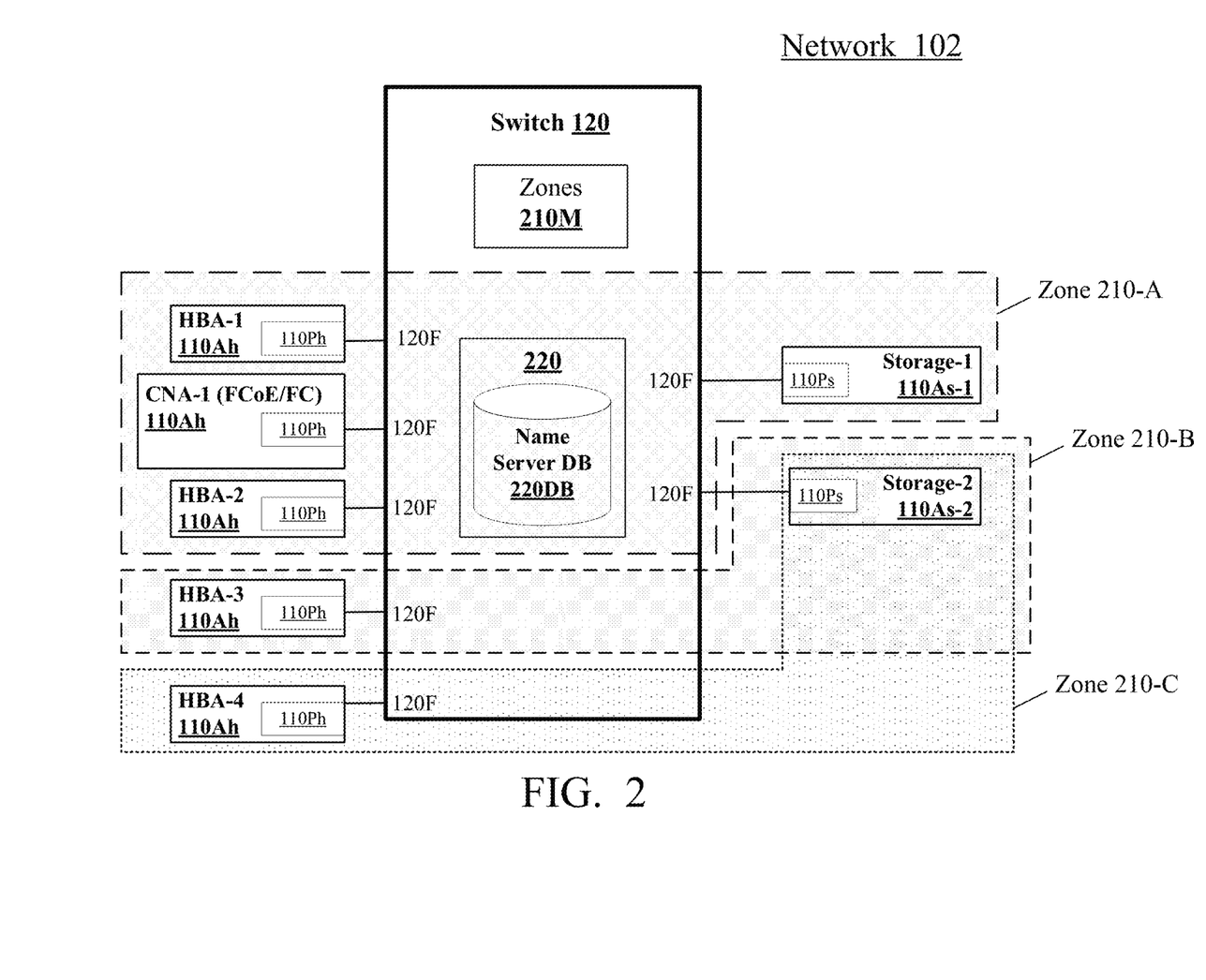

FIG. 2 illustrates an FC network with three zones 210: 210-A, 210-B, 210-C. Only one switch 120 is shown. Nodes 110 are not shown in their entirety; only their adaptors 110A are shown (as 110Ah for initiators and 110As for targets). Each adaptor 110A has one or more ports 110P (marked 110Ph for initiators, and 110Ps for targets); each port 110P can be connected to a port 120F of switch 120. A node 110 may have multiple adaptors 110A connected to the switch fabric; and an adaptor may have multiple ports 110P connected to the switch fabric. Each adaptor 110A is identified by a World Wide Name (WWN), which is a unique hardware name burned into the adaptor. Each port 110P is identified by World Wide Port Name (WWPN) which is a unique hardware identifier.

Zones 210 are defined by a list of nodes 110 in each zone. Alternatively, the zones are defined at a finer granularity by a list of adaptors 110A in each zone (e.g. a list of WWNs), or a list of ports 110P (e.g. a list of WWPNs), or a list of the corresponding switch ports 120F. A zone member can also be a device 130, or a device's area (volume), listed as a Logical Identification Number (LUN) for example.

The initiator adaptors 110Ah are labeled in FIG. 2 as HBA-1 through HBA-4, and CNA-1. "HBA" stands for "host bus adaptor"; its ports 110P are connected to switches via fiber optic links. "CNA" stands for "converged network adaptor"; its ports are connected to switches by Ethernet-compliant links to implement Fibre Channel over Ethernet (FCoE); such links can carry any Ethernet traffic, including an Ethernet frame encapsulating an FC frame.

The target ports 110As are labeled as 110As-1 and 110As-2 in FIG. 2.

Each switch includes a name server 220 which maintains a database 220DB storing, in the switch's memory, information on nodes 110 and their adaptors and ports connected to the switches 120. That information includes the adaptors' WWNs and ports' WWPNs. The switch's zone module 210M, possibly a server, stores data defining each zone, e.g. each zone's WWNs or WWPNs.

Figure 6:
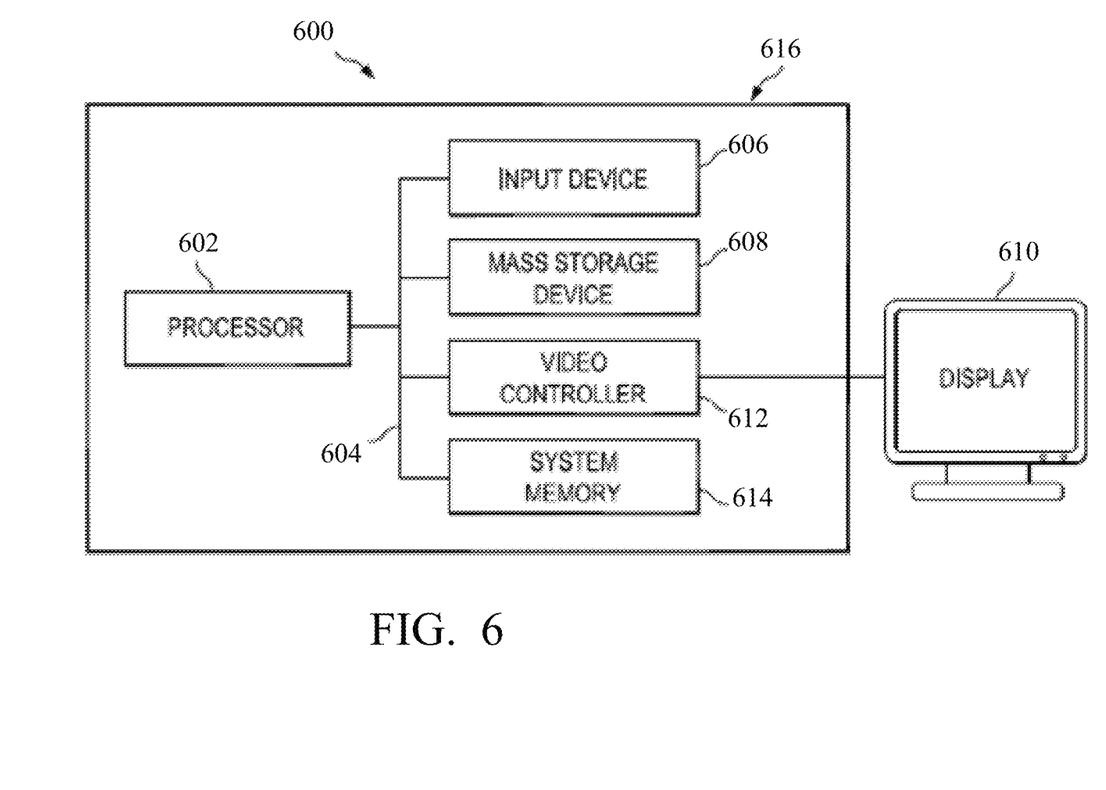
FIG. 6 shows an information handling system architecture used in some embodiments of the present invention.

Servers and modules, such as 220 and 210M, are implemented for example by data and software instructions stored in the switch's memory; the instructions are executed by the switch's processor(s), not shown in FIG. 2; see FIG. 6 described below.

In FIG. 2, zone 210-A consists of adaptors HBA-1, CNA-1, HBA-2, and 110As-1. Zone 210-B consists of adaptors HBA-3 and 110As-2. Zone 210-C consists of adaptors HBA-4 and 110As-2.

If adaptor 110As-2 or some other part of the corresponding node changes state, then switch 120 will send RSCNs to adaptors HBA-3 and HBA-4 only.

If adaptor 110As-1 or some other part of its node changes state, only the adaptors HBA-1, CNA-1, and HBA-2 will get RSCNs.

If adaptor HBA-1 changes state, then only adaptors CNA-1, HBA-2, and 110As-1 will get RSCNs.

It is desirable to further reduce the RSCN traffic.

SUMMARY

This section summarizes some features of the invention. Other features may be described in the subsequent sections. The invention is defined by the appended claims, which are incorporated into this section by reference.

One known method to reduce the RSCN traffic is to define a separate zone for each initiator/target pair that communicate with each other, e.g. for each pair of an initiator node and a target node, or of an initiator adaptor 110Ah and a target adaptor 110As, or of ports 110Ph/110Ps. Of note, a node 110 may have one or more target ports and one or more initiator ports in the same or different adaptors. For ease of discussion, we will sometimes assume that each node 110 has only one adaptor connected to the switch fabric, and each adaptor has only one port connected to the switch fabric, but the same reasoning applies when a node has multiple adaptors connected to the switch fabric, or an adaptor has multiple ports connected to the switch fabric.

In this zoning strategy—a separate zone for each initiator/target pair—the RSCN traffic is reduced significantly, but a large number of zones is needed. This increases the memory used by zone module 210M, and also increases the burden and confusion for the human administrator in configuring the zones each time a new initiator or target is added to the network and each time a node 110 becomes eligible or ineligible to communicate with another node.

Another known technique, called many-to-one zoning, is to define a separate zone for each target 110s and multiple initiators 110h allowed to communicate with the target. The number of zones is reduced, but the RSCN traffic is increased because any node's change of state causes RSCNs to all the other nodes in the zone regardless of whether those nodes communicate with the change-of-state node.

In some embodiments of the present invention, rather than finding new ways to define zones, the inventors define a new type of RSCN strategy that can be used in any zone: when an initiator changes state, the RSCNs are sent only to the targets in the same zone, but not to any initiators. The switches 120 store the role—initiator or target or both—of each node 110 (or each adaptor 110A, or each port 110P) connected to the switch fabric, and use this storage to determine where to send the RSCNs. If a node 110 is both an initiator and a target, then it is treated as a target, i.e. it receives all the RSCNs in its zone(s).

This strategy can be used independently or in addition to any zoning strategy, even if there are no zones or if the entire network is a single zone. The RSCNs are sent only to the targets, including the nodes 110 that can be both initiators and targets.

One known strategy to limit RSCN traffic within a zone is Peer Zoning, described by Brocade Communications Systems, Inc., of the United States of America, now part of Broadcom Limited, having an office in the United States of America. See http://www.brocade.com/content/html/en/administration-guide/fos-740-admin/GUID-179B37D8-BA09-488E-BCC7-E8550D053388.html. For a Peer Zone, a network administrator designates one or more nodes 110 as "principal devices". The non-principal devices 110 are allowed to communicate only with the principal devices in the same zone. When a non-principal device changes state, only the principal devices receive RSCNs.

However, Peer Zoning requires an additional configuration action, e.g. by a human administrator, to define the principal and non-principal devices. In contrast, some embodiments of the present invention do not need additional configuration. The switches 120 learn the nodes' roles—initiator or target or both—from conventional communications with the nodes, e.g. from the nodes' RFF_ID Name Server requests ("RFF" stands for "Register FC-4 Features") routinely sent by the nodes to the switches. See INCITS 510-201x, T11/Project 2204-D/Rev 10.8, FIBRE CHANNEL GENERIC SERVICES-7 (FC-GS-7) REV 10.8, INCITS working draft proposed American National Standard for Information Technology, Aug. 3, 2016, incorporated herein by reference. Therefore, the nodes' roles are available to the switches without additional configuration. All that the switches need to do is to use the roles in RSCN scheduling.

In some embodiments, different zones may be configured differently for the RSCN purposes: some zones may limit the RSCNs based on the nodes' roles as described above, while other zones may use conventional RSCN strategies, possibly Peer Zoning or some other zoning techniques, and may disregard the nodes' roles in sending the RSCNs.

The above features illustrate but do not limit the invention. In particular, a zone may include nodes 110 not directly connected to the switch fabric, such as the nodes in an arbitrated loop.

The invention is not limited to Fibre Channel networks. Other embodiments and variations are within the scope of the invention, as defined by the appended claims.

DESCRIPTION OF SOME EMBODIMENTS

The embodiments described in this section illustrate but do not limit the invention. The invention is defined by the appended claims.

As noted above, the invention is not limited to Fibre Channel (FC) networks, but may include other network types. A network node may be an initiator or a target or both. A node may have multiple ports 110P, with some ports supporting an initiator function but not a target function, and other ports supporting a target function but not initiator function, and still other ports supporting both functions.

The term "target" refers to a node having one or more data storage devices 130, such as disks, tapes, and perhaps other types, possibly (but not necessarily) implementing block storage of data, i.e. with data being stored and accessed in fixed-size blocks. In some embodiments, the storage areas in devices 130 are addressable, and the address spaces are exposed to initiators 110h, so an initiator can access the devices 130 by specifying an address, as if the initiator were connected to devices 130 by a common bus such as SCSI (Small Computer Serial Interface). For example, in FC networks, a node's devices 130 can be logically viewed as a number of volumes (same as in SCSI). A volume may be a separate device (e.g. disc) or part of a device. The volume has a Logical Unit Number (LUN). When an initiator wishes to access a storage area, the initiator sends a command to the target (a SCSI command for example). A command may be READ, WRITE, FORMAT, or some other type. Some commands, including READ and WRITE commands, specify a specific area in devices 130 by the LUN and Logical Block Address (LBA). LBA is an offset within LUN. The commands may also specify the transfer length, defining the length of the data to be read or written at the LUN/LBA address.

A target node 110s may provide to switch fabric 120 or an initiator node 110h various types of information about the target's devices 130, including the LUNs and associated storage sizes (e.g. in block or byte units).

A target node 110s may also be an initiator, e.g. to back up its devices 130 to another target. In same embodiments, the same port 110P may support both an initiator function and a target function.

Initiators 110*h* may be connected to another network, e.g. the Internet, to service requests from user computers outside of network 102. Network 102 may or may not be the whole or a part of a commercial data center network.

Figure 3:
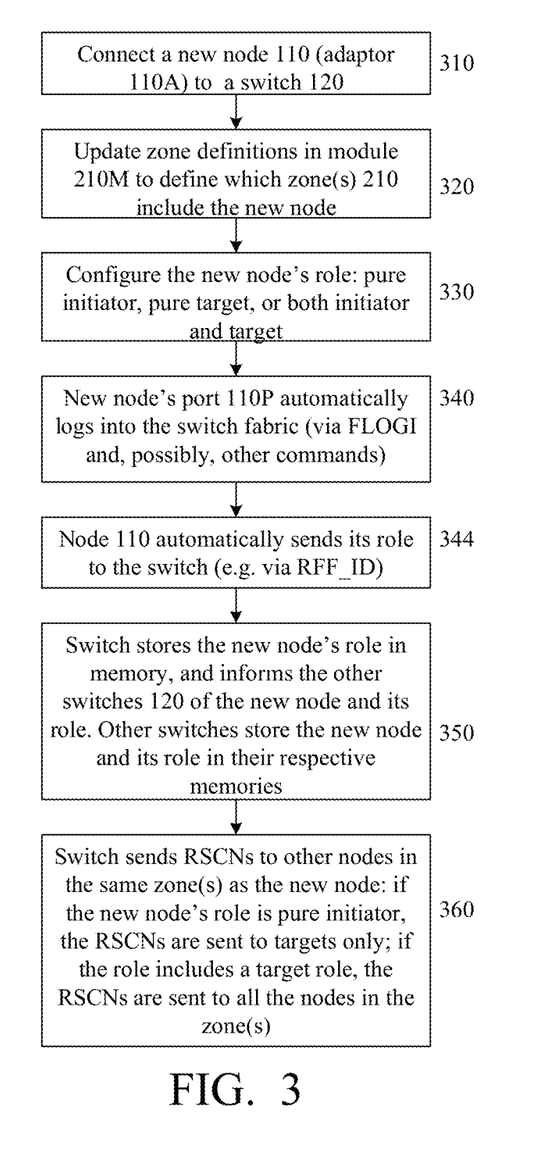
FIG. 3 is a flowchart of network operations according to some embodiments of the present invention.

FIG. 3 is a flowchart showing an exemplary network operation when a new node 110 is connected to a switch 120 (at step 310), e.g. for the network of FIG. 1 or 2. It will be assumed that each node has only one adaptor, and each adaptor has only one port. But the same operations are performed when a new adaptor 110A is connected to the network even if other adaptors of the same node have been previously connected to the network, or a new port 110P is connected to the network when other ports of the same node or adaptor have been previously connected to the network.

At step 320, either before or after or during the step 310, zone 210 definitions are updated (or created) in switch (or switches) 120 to define which zones 210 contain the new node 110 (or the new node's adaptor 110A or port 110P, or the node's LUNs if the node is a target, or the node's corresponding switch port 120F). Zone updating involves updating the zone module 220M of each switch, possibly by a human administrator action. If zone membership is defined by switch ports 120F, then hardware reconfiguration may be needed to update the zones.

At step 330, either before or after or during the steps 310 and 320, the new node's role (or adaptor's or port's role) is provided to the new node 110, possibly by a human administrator. The role may be target only ("pure target"), or initiator only (pure initiator), or both.

At step 340, the new node's port 110P logs into the switch fabric. The login can be performed via the conventional FLOGI service. Specifically, the node 110 sends, on port 110P, a frame that specifies the node's adaptor's WWN, the port's WWPN, and other information about the new node. WWN and WWPN can be conventional, globally unique, 64-bit numbers.

The switch assigns a 24-bit Fibre Channel ID (FC_ID) to the new node's port 110P, and sends the FC_ID back to the port.

At step 344, the new node sends its role to the switch on the newly connected port 110P. This can be done by the port 110P transmitting an RFF_ID Name Server request, illustrated in FIG. 5 described below.

At step 350, the switch stores the role in the switch's memory, e.g. in the name server database 220DB (FIG. 2). The switch also informs the other switches of the new node and its newly connected port, including the port's FC_ID, WWN, WWPN, and role. The other switches store that information in their name server databases 220DB or some other databases. Steps 310-350 may or may not be conventionally implemented.

At step 360, the switch sends RSCNs to other nodes in the same zone(s) as the new node. The RSCNs are sent based on the new node's role (or adaptor's or port's role): if the role is pure target or both target and initiator, the RSCNs are sent to all the other zone members (nodes or adaptors or ports or LUNs) in the same zone(s), or at least all the other zone members registered with the switch fabric to receive the RSCNs. (Such registration is performed by a node sending an SCN command to the switch fabric; the SCN stands for State Change Notification.) If the new node's role is pure initiator, the RSCNs are not sent to pure initiators, but are sent to the targets, i.e. pure targets and those zone members that are both targets and initiators.

Step 360 is repeated for any state change in network 102 that affects inter-node communications. If a state change occurs in any node 110, the switch 120 closest to the node (e.g. directly connected to the node) detects the change, gets the node's or adaptor's or port's role (e.g. from the switch's name server database 210DB), and sends the RSCNs based on the role as in step 360. Step 350 may also be performed, i.e. the switch may update its databases to reflect the change and may inform other switches, if any, of the change. The other switches may also update their databases to reflect the change.

Figure 4:
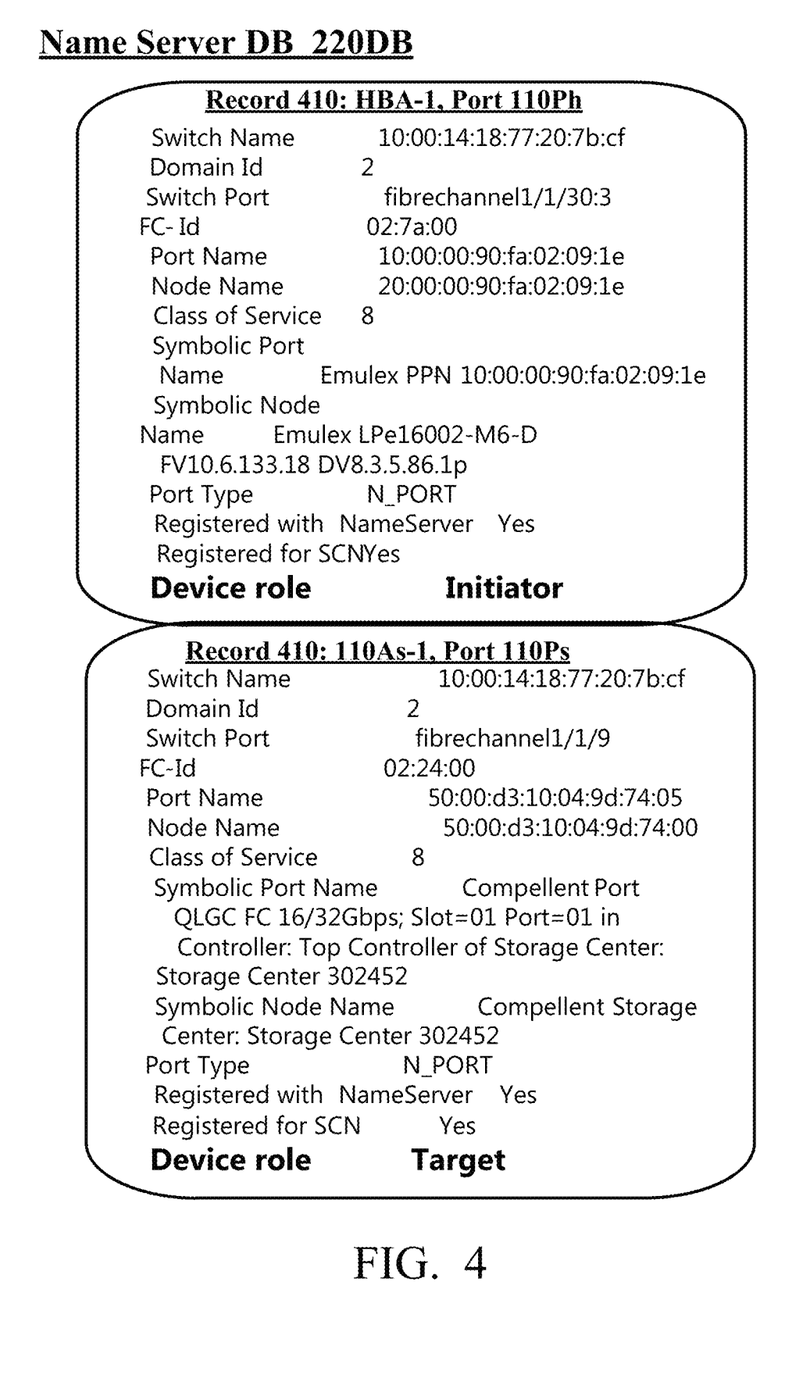
FIG. 4 illustrates data records used by a switch in some embodiments of the present invention.
Figure 5:
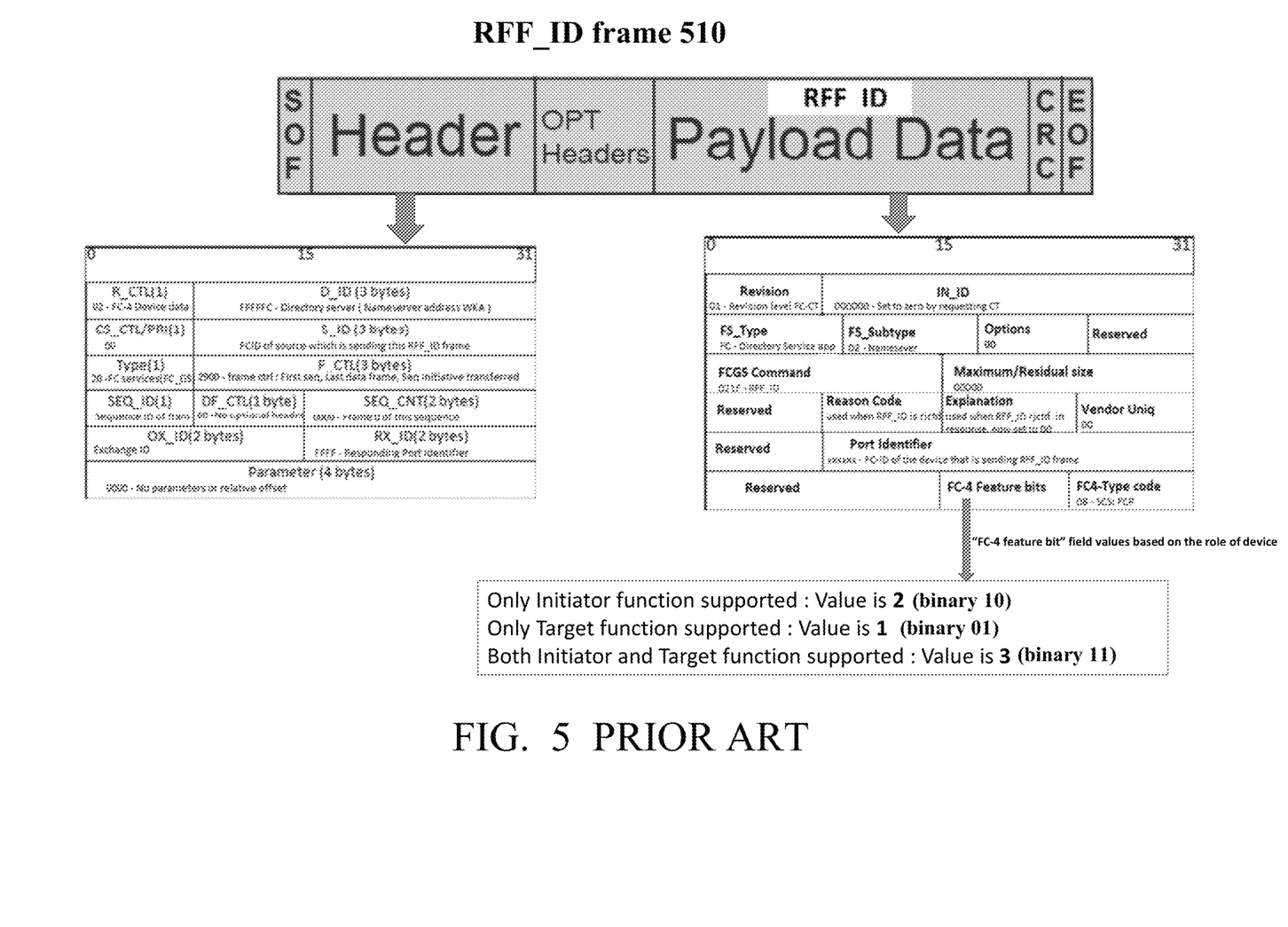
FIG. 5 shows a prior art data frame used in some embodiments of the present invention to create the data records of FIG. 4.

FIG. 4 shows exemplary data records 410 that can be stored for each port 110P in a name server database 220DB of each switch 120 in the example of FIG. 2. FIG. 4 shows data records 410 for ports 110P of host adaptors HBA-1 and 110As-1. In each record 410, "Node Name" is the corresponding adaptor's WWN. "Port Name" is the corresponding port's WWPN. The port's role is shown at the bottom of each record: "Initiator" (meaning pure initiator) for port 110Ph of adaptor HBA-1, and "Target" (meaning pure target) for port 110Ps of adaptor 110As-1. The roles are obtained by the switch from the RFF_ID frames 510 (FIG. 5).

An RFF_ID frame 510 is sent to the switch fabric at step 344. The frame is addressed to name server 220, as shown in the D_ID field. "WKA" means a Well-Known Address, and is hexadecimal FFFFC. The S_ID field (source address) contains the new node's FC_ID generated by the switch at step 340. Near the end of the frame, the new node's role is coded in two bits of "FC-4 Feature bits", as follows:

10 means pure initiator;
01 means pure target;
11 means both target and initiator.

The invention is not limited to the RFF_ID, FLOGI, or any other implementation of steps 340 and 344, nor to any implementation of other steps or of nodes 110 or switches 120, except as defined by the appended claims. The hardware architecture of each node 110 or 120 or their port or adaptor may or may not be conventional. One conventional architecture is illustrated in FIG. 6, showing a computer system 600, which may or may not be a conventional system. The system of FIG. 6 is an information handling system (IHS). Specifically, as the value and use of information continues to increase, individuals and businesses seek additional ways to process and store information. An information handling system processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In one embodiment, IHS 600 includes a processor (or processors) 602 connected to a bus 604. Bus 604 serves as a connection between processor 602 and other components of IHS 600. An input device 606 is coupled to processor 602 to provide input to processor 602. Examples of input devices may include keyboards, touchscreens, pointing devices such as mouses, trackballs, and trackpads, and/or a variety of other input devices known in the art. Programs and data (e g name server 210, zone module 210M, and their respective databases) are stored on a mass storage device 608, which is coupled to processor 602. Examples of mass storage devices may include hard discs, optical disks, magneto-optical discs, solid-state storage devices, and/or a variety other mass storage devices known in the art. IHS 600 further includes a display 610, which is coupled to processor 602 by a video controller 612. A system memory 614 is coupled to processor 602 to provide the processor with fast storage to facilitate execution of computer programs (including possibly the name server and zone module programs) by processor 602. Examples of system memory may include random access memory (RAM) devices such as dynamic RAM (DRAM), synchronous DRAM (SDRAM), solid state memory devices, and/or a variety of other memory devices known in the art. In an embodiment, a chassis 616 houses some or all of the components of IHS 600. It should be understood that other buses and intermediate circuits can be deployed between the components described above and processor 602 to facilitate interconnection between the components and the processor 602.

The invention covers a non-transitory computer readable medium (e.g. compact disk, flash memory, or other type) comprising one or more computer instructions which, when executed by a processor or processors of a switch 120, cause the switch to perform the methods within the scope of the present invention. The instructions can be stored in the switch's memory.

Some embodiments of the invention are defined by the following clauses:

1. A method for operating a first switch (e.g. 120) in a network comprising a first set (e.g. a zone 210) of communication entities (e.g. nodes or their ports or adaptors or LUNs) communicating over the first switch, each communication entity being associated with a network node using the communication entity in communicating over the first switch, each communication entity having a role in said communicating, the role being one of: pure target, pure initiator, or both target and initiator,
the method comprising:
obtaining, by the first switch, a status change indication for a first entity which is one of the communication entities, or for the first entity's node;
in response to the status change indication:
determining the first entity's role;
taking into account the first entity's role, determining whether to send a status change notification (e.g. RSCN) to a second entity which is one of the communication entities, and sending the status change notification to the second entity if it determined that the status change notification is to be sent to the second entity.

2. The method of clause 1 wherein the second entity is associated with a different node than the first entity.

3. The method of clause 1 or 2 wherein determining whether to send the status change notification to the second entity is performed taking into account the second entity's role.

4. The method of any one of clauses 1 to 3, wherein if the first entity's role is pure initiator, then:
if the second entity's role is pure initiator, then the second entity is not sent the status change notification.

5. The method of any one of clauses 1 to 4 wherein if the first entity's role is pure initiator, then the status change notification is not sent to any other communication entity having the pure initiator role.

6. The method of any one of clauses 1 to 5 wherein if the first entity's role is pure target or both target and initiator, then the status change notification is sent or not sent to other communication entities without regard to their roles.

7. The method of any one of clauses 1 to 6 wherein the first entity is a node's port or adaptor.

8. The method of any one of clauses 1 to 6 wherein the first entity is a computer storage area defined by a Logical Unit Number in a node's computer storage device.

9. A first switch configured to operate in a network comprising a first set of communication entities communicating over the first switch, each communication entity being associated with a network node using the communication entity in communicating over the first switch, each communication entity having a role in said communicating, the role being one of: pure target, pure initiator, or both target and initiator,
the first switch being configured to perform a method comprising:
obtaining, by the first switch, a status change indication for a first entity which is one of the communication entities, or for the first entity's node;
in response to the status change indication:
determining the first entity's role;
taking into account the first entity's role, determining whether to send a status change notification to a second entity which is one of the communication entities, and sending the status change notification to the second entity if it determined that the status change notification is to be sent to the second entity.

10. The switch of clause 9 wherein the second entity is associated with a different node than the first entity.

11. The switch of clause 9 or 10 wherein determining whether to send the status change notification to the second entity is performed taking into account the second entity's role.

12. The switch of any one of clauses 9 to 11 wherein in the method, if the first entity's role is pure initiator, then:
if the second entity's role is pure initiator, then the second entity is not sent the status change notification.

13. The switch of any one of clauses 9 to 12 wherein in the method, if the first entity's role is pure initiator, then the status change notification is not sent to any other communication entity having the pure initiator role.

14. The switch of any one of clauses 9 to 13 wherein in the method, if the first entity's role is pure target or both target and initiator, then the status change notification is sent or not sent to other communication entities without regard to their roles.

15. The switch of any one of clauses 9 to 14 wherein in the method, the first entity is a node's port or adaptor.

16. The switch of any one of clauses 9 to 14 wherein in the method, the first entity is a computer storage area defined by a Logical Unit Number in a node's computer storage device.

17. A non-transitory computer readable medium comprising computer instructions for execution by one or more computer processors of a first switch to configure the first switch to operate in a network comprising a first set of communication entities communicating over the first switch, each communication entity being associated with a network node using the communication entity in communicating over the first switch, each communication entity having a role in said communicating, the role being one of: pure target, pure initiator, or both target and initiator, the first switch being configured by the one or more computer instructions to perform a method comprising:

obtaining, by the first switch, a status change indication for a first entity which is one of the communication entities, or for the first entity's node;

in response to the status change indication:

determining the first entity's role;

taking into account the first entity's role, determining whether to send a status change notification to a second entity which is one of the communication entities, and sending the status change notification to the second entity if it determined that the status change notification is to be sent to the second entity.

18. The computer readable medium of clause 17 wherein the second entity is associated with a different node than the first entity.

19. The computer readable medium of clause 17 or 18 wherein determining whether to send the status change notification to the second entity is performed taking into account the second entity's role.

20. The computer readable medium of any one of clauses 17 to 19 wherein in the method, if the first entity's role is pure initiator, then:

if the second entity's role is pure initiator, then the second entity is not sent the status change notification.

The invention is not limited to the embodiments described above. Some embodiments include FCoE links and non-FC networks. A zone may have members of a different kind, i.e. a zone may include an adaptor member, a port member, and a LUN member. Other embodiments and variations are within the scope of the invention, as defined by the appended claims.

The invention claimed is:

1. A method for operating a first switch in a network comprising a first set of communication entities communicating over the first switch, each communication entity being associated with a network node using the communication entity in communicating over the first switch, each communication entity having a role in said communicating, the role being one of: pure target, pure initiator, or both target and initiator, the method comprising:

obtaining, by the first switch, one or more status change indications each of which is for a respective first entity which is one of the communication entities, or for the respective first entity's node;

in response to each said status change indication:

determining the respective first entity's role, which is pure target, pure initiator, or both target and initiator;

taking into account the respective first entity's role, determining whether to send a status change notification to each of one or more second entities each of which is one of the communication entities;

wherein:

for at least one status change indication and at least one second entity, it is determined, taking into account the respective first entity's role, that the status change notification is to be sent to the second entity, and the method comprises sending the status change notification to the second entity based on said determining, taking into account the respective first entity's role, that the status change notification is to be sent to the second entity;

for at least one status change indication and at least one second entity, it is determined, taking into account the respective first entity's role, that the status change notification is not to be sent to the second entity, and the method comprises not sending the status change notification to the second entity based on said determining, taking into account the first entity's role, that the status change notification is not to be sent to the second entity.

2. The method of claim 1 wherein for at least one status change notification and at least one second entity, the second entity is associated with a different node than the respective first entity.

3. The method of claim 1 wherein for at least one status change notification and at least one second entity, determining whether to send the status change notification to the second entity is performed taking into account the second entity's role.

4. The method of claim 1 wherein for each status change notification and each second entity, if the respective first entity's role is pure initiator, then:

if the second entity's role is pure initiator, then the second entity is not sent the status change notification;

wherein for at least one status change notification, the respective first entity's role is pure initiator, and at least one second entity's role is pure initiator.

5. The method of claim 4 wherein for each status change notification, if the respective first entity's role is pure initiator, then the status change notification is not sent to any other communication entity having the pure initiator role.

6. The method of claim 1 wherein if the respective first entity's role is pure target or both target and initiator, then the status change notification is sent or not sent to other communication entities without regard to their roles;

wherein for at least one status change notification, the respective first entity's role is pure target or both target and initiator.

7. The method of claim 1 wherein for at least one status change notification, the respective first entity is a node's port or adaptor.

8. The method of claim 1 wherein for at least one status change notification, the respective first entity is a computer storage area defined by a Logical Unit Number in a node's computer storage device.

9. A first switch configured to operate in a network comprising a first set of communication entities communicating over the first switch, each communication entity being associated with a network node using the communication entity in communicating over the first switch, each communication entity having a role in said communicating, the role being one of: pure target, pure initiator, or both target and initiator, the first switch being configured to perform a method comprising:

obtaining, by the first switch, a status change indication for a first entity which is one of the communication entities, or for the first entity's node;

in response to the status change indication:

determining the first entity's role;

taking into account the first entity's role, determining whether to send a status change notification to a second entity which is one of the communication entities, and sending the status change notification to the second entity if it is determined that the status change notification is to be sent to the second entity, and not sending the status change notification to the second entity if it is determined that the status change notification is not to be sent to the second entity.

10. The switch of claim 9 wherein the second entity is associated with a different node than the first entity.

11. The switch of claim 9 wherein determining whether to send the status change notification to the second entity is performed taking into account the second entity's role.

12. The switch of claim 9 wherein in the method, if the first entity's role is pure initiator, then:
if the second entity's role is pure initiator, then the second entity is not sent the status change notification.

13. The switch of claim 9 wherein in the method, if the first entity's role is pure initiator, then the status change notification is not sent to any other communication entity having the pure initiator role.

14. The switch of claim 9 wherein in the method, if the first entity's role is pure target or both target and initiator, then the status change notification is sent or not sent to other communication entities without regard to their roles.

15. The switch of claim 9 wherein in the method, the first entity is a node's port or adaptor.

16. The switch of claim 9 wherein in the method, the first entity is a computer storage area defined by a Logical Unit Number in a node's computer storage device.

17. A non-transitory computer readable medium comprising computer instructions for execution by one or more computer processors of a first switch to configure the first switch to operate in a network comprising a first set of communication entities communicating over the first switch, each communication entity being associated with a network node using the communication entity in communicating over the first switch, each communication entity having a role in said communicating, the role being one of: pure target, pure initiator, or both target and initiator, the first switch being configured by the one or more computer instructions to perform a method comprising:
obtaining, by the first switch, a status change indication for a first entity which is one of the communication entities, or for the first entity's node;
in response to the status change indication:
determining the first entity's role;
taking into account the first entity's role, determining whether to send a status change notification to a second entity which is one of the communication entities, and sending the status change notification to the second entity if it is determined that the status change notification is to be sent to the second entity, and not sending the status change notification to the second entity if it is determined that the status change notification is not to be sent to the second entity.

18. The computer readable medium of claim 17 wherein the second entity is associated with a different node than the first entity.

19. The computer readable medium of claim 17 wherein determining whether to send the status change notification to the second entity is performed taking into account the second entity's role.

20. The computer readable medium of claim 17 wherein in the method, if the first entity's role is pure initiator, then:
if the second entity's role is pure initiator, then the second entity is not sent the status change notification.

* * * * *